United States Patent [19]
Radford

[11] 3,823,827
[45] July 16, 1974

[54] MEMBRANE SUPPORT SYSTEM
[75] Inventor: David L. Radford, Salt Lake City, Utah
[73] Assignee: Vital Assists, Inc., Salt Lake City, Utah
[22] Filed: Apr. 11, 1972
[21] Appl. No.: 242,994

Related U.S. Application Data
[63] Continuation-in-part of Ser. No. 106,184, Jan. 13, 1971, Pat. No. 3,723,305.

[52] U.S. Cl. .................. 210/238, 210/321, 210/493
[51] Int. Cl. ............................................ B01d 31/00
[58] Field of Search ............ 210/22, 232, 238, 321, 210/493

[56] References Cited
UNITED STATES PATENTS
3,411,630   11/1968   Alwall et al. ..................... 210/321
3,578,172   5/1971    Sirotkina et al. .................. 210/321
3,627,137   12/1971   Bier ................................ 210/321
3,631,986   1/1972    Sausse ............................ 210/321
3,667,612   6/1962    Leonard .......................... 210/321
3,695,445   10/1973   Esmund ........................ 210/493 X
3,730,351   5/1973    Veronesi ......................... 210/321
3,762,555   10/1973   Boe et al. ........................ 210/321

Primary Examiner—Frank A. Spear, Jr.
Attorney, Agent, or Firm—H. Ross Workman

[57] ABSTRACT

An extracorporeal hemodialyzing system formed of a plurality of stacked plates defining a convoluted path for a tubular membrane. Each plate has a removably attached flexible veneer including an improved wedge support system formed of wedgeshaped support elements which are easily machine-tooled and which accommodate adequate membrane support with reduced masking. Dowels and mating recesses maintain the plates and connected veneers in proper alignment. The plates are assembled on a novel clamp assembly which evenly distributes a compressing force throughout the stacked plates such that a generally uniform pressure exists over the membrane path.

11 Claims, 5 Drawing Figures

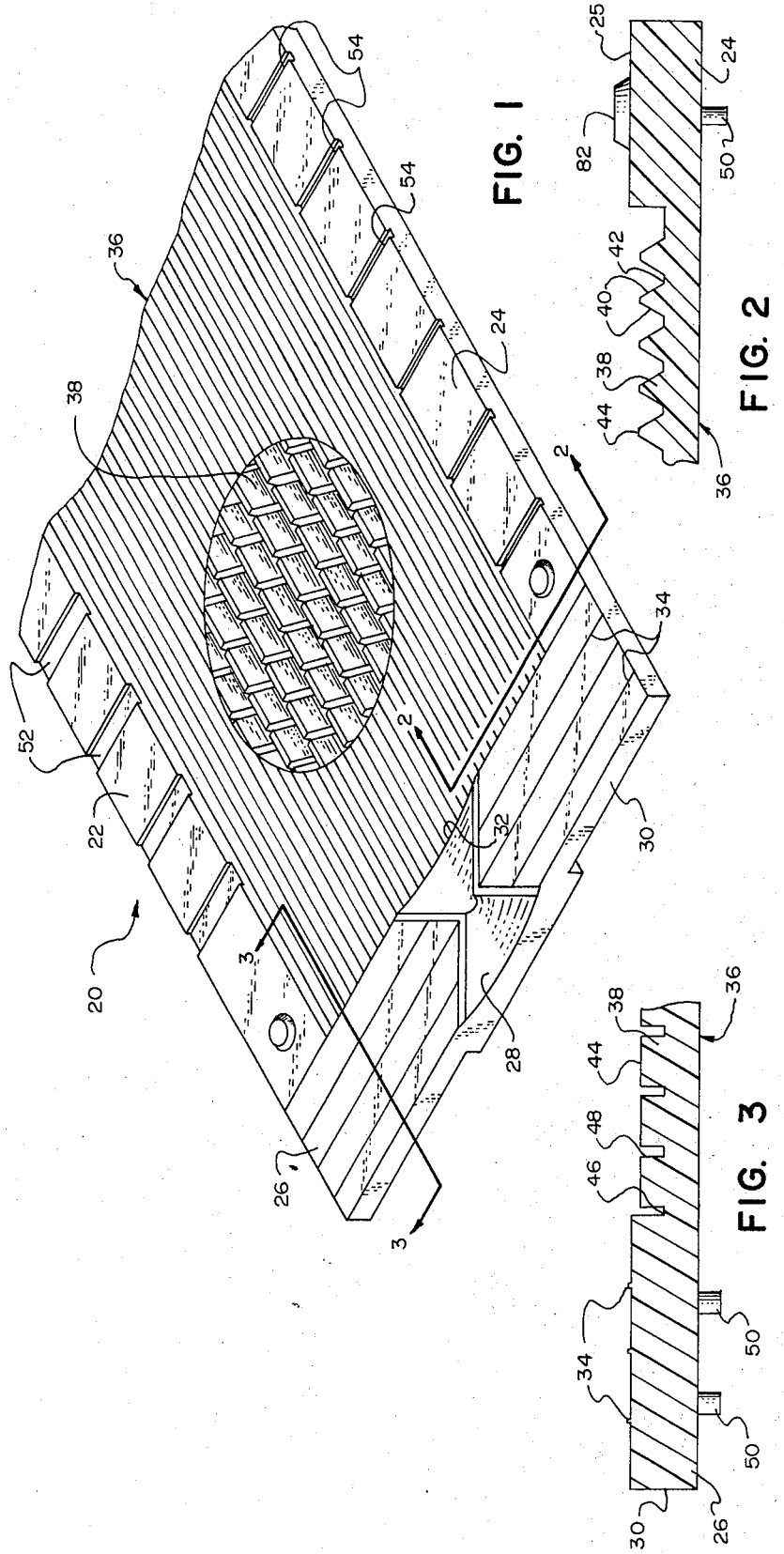

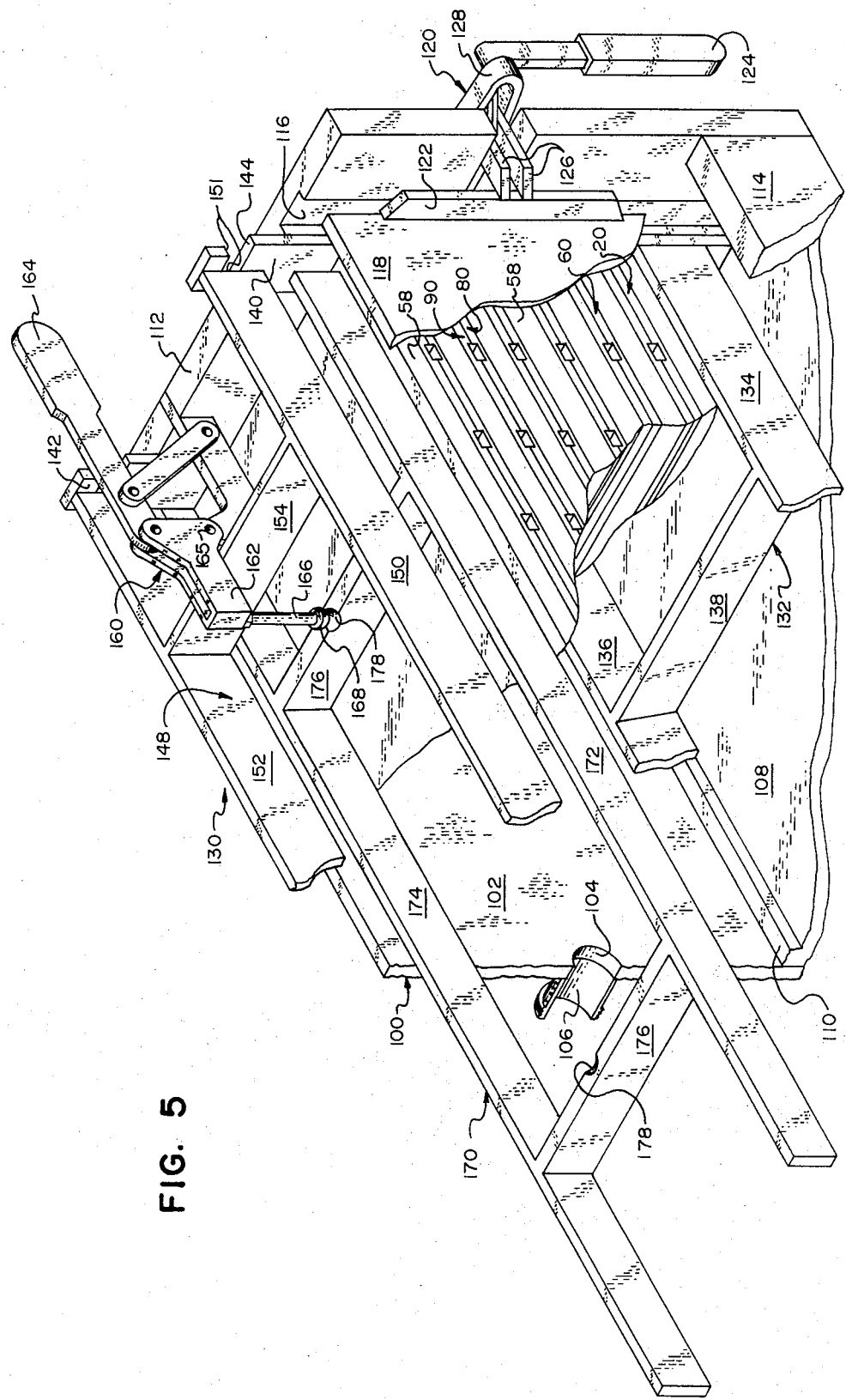

MEMBRANE SUPPORT SYSTEM

This application is a continuation-in-part of copending patent application Ser. No. 106,184, filed Jan. 13, 1971, now U.S. Pat. No. 3,723,305.

BACKGROUND

1. Field of the Invention

The present invention relates to a novel membrane support system and more particularly to improved structure for maximizing the efficiency of membrane hemodialysis.

2. The Prior Art

Historically, kidney diseases have been of critical concern to human life. Many kinds of kidney diseases interfere with the function of the kidneys such that the kidney ceases to remove waste and excess water from the blood. When the kidney is sufficiently impaired that a large portion of the waste products and water are not removed from the blood, the life of the patient cannot be preserved unless a way is provided for artificially performing the function of the impaired kidney.

An early advancement in the artificial kidney art was founded upon the theory of the Kiil kidney which was based on the principle that waste materials can be removed by dialysis through a membrane, through which desirable blood components do not pass. The theory under which the Kiil kidney operates is that when the blood, having a relatively high concentration of waste products, is separated by a membrane from a dialysate fluid having a very low concentration of waste products, the waste products will migrate from the high concentration fluid (blood) through the membrane to the low concentrarion fluid (dialysate). Excess water can, at the same concentration be removed from the blood through the membrane by ultrafiltration, i.e. by maintaining a positive pressure differential between the blood and the dialysate fluid on the opposite side of the membrane.

There are various types of conventional artificial kidneys other than the Kiil type. The best known is the Kolff-type (Kolff) kidney in which a cylindrically coiled membrane is continually exposed to circulating dialyzing fluid. However, the present invention is structurally most closely related to the Kiil-type kidney and therefore attention is directed thereto.

The Kiil kidney comprises a plurality of large flat membranes supported by grooved plates in a sandwich-like construction. Each pair of grooved plates normally is provided with two taut membranes between them. The plates and membranes are held together with a number of bolts which must be carefully tightened individually to develop a precise torque. The precision torque is necessary to insure that there is sufficient compressive force to prevent leakage of blood and/or dialysate but not so much force that the membrane is damaged. Dialysate fluid is normally caused to flow through the assembly between the grooves on each plate in counterflow to the patient's blood which is caused to flow through the assembly between the two membranes. The blood has a higher absolute pressure than the dialysate fluid so that the blood pressure keeps the membranes spaced apart.

Unfortunately, however, it has been found that current clinical practice in the hemodialysis of chronic uremics requires from 14 to as many as 30 hours of dialysis for weekly treatments with a Kiil dialyzer, depending upon the body weight of the patient and the flow rate of the blood. Moreover, the intricate and elaborate structure normally forming the Kiil dialyzer requires much effort to assemble, prime and operate the Kiil dialyzer. Also, the membranes used in the Kiil dialyzer are not easily replaced without substantial effort, not only in the disassembly and reassembly of the dialyzer apparatus, but also in aseptic technique which is critically essential to preserve the patient from septicemia.

Most recently, efforts have been made to improve upon the Kiil kidney hemodialysis to avoid some of the most objectionable of the aforementioned limitations. A point support surface was substituted for the grooves in the plates in the dialyzer produced by Western-Kiil of Compton, California. Other improvements are found in U.S. Pat. Nos. 3,443,388; 3,458,048; and 3,326,380. A most significant and highly successful improvement on the Kiil dialyzer is described in applicant's copending application Ser. No. 106,184, filed Jan. 13, 1971.

Point supports must be constructed with much care. If the points are too sharp, pressure in the membrane may cause the point supports to pierce through. If the points are too flat, much of the membrane will be masked by the supports thereby substantially reducing the membrane surface area through which dialysis can take place. Masking is of much importance in the efficiency of dialysis through a membrane.

While a point support surface has been found to significantly improve dialysis across the membrane, the manufacture of point support surfaces has been accomplished only with much difficulty. Known point support surfaces have normally had a conical or pyramidal configuration which can be made only by precision machining. Further, because the point support surface has conventionally formed an integral part of separator plates forming the membrane path, cleaning and sterilizing the separator plates between each use has been time-consuming and tedious.

In addition, until this present invention, structure which exerts a substantially uniform pressure over the entire point support plate assembly and which at the same time accommodates quick removal and replacement of separator plates has not been known.

BRIEF DESCRIPTION AND OBJECTS OF THE INVENTION

The present invention provides a novel wedge support configuration which can be easily manufactured and which minimizes masking during the dialysis operation. In addition, the wedge support bed is constructed in the form of a removable veneer so that it can be easily cleaned and sterilized or, alternatively, disposed of after use. Each wedge support surface is provided with alignment structure which automatically aligns the assembled wedge support plates and an improved clamping arrangement facilitates an essentially uniform distribution of compressive force over the support plates while at the same time facilitating quick release and removal of the support plates.

It is, therefore, a primary object of the present invention to provide an improved hemodialyzing device.

It is another object of the present invention to provide an improved wedge support configuration for supporting a hemodialyzing membrane.

One still further object of the present invention is to provide novel structure accommodating removal of a membrane support array from a separator plate assembly.

One still further valuable object of the present invention is to provide membrane support structure which is self-aligning.

Another and no less valuable object of the present invention is to provide improved membrane support clamping structure.

These and other objects and features of the present invention will become more apparent from the following description and appended claims taken in conjunction with the accompanying drawings.

BRIEF DESCRIPTION OF THE DRAWINGS

FIG. 1 is a fragmentary perspective illustration of a presently preferred membrane support veneer embodiment of the invention, portions of the veneer being magnified to illustrate the configuration of small wedge-shaped elements thereof;

FIG. 2 is an enlarged fragmentary cross-sectional view taken along lines 2—2 of FIG. 1;

FIG. 3 is an enlarged fragmentary cross-sectional view taken along lines 3—3 of FIG. 1;

FIG. 5 is a fragmentary perspective view of a presently preferred clamping assembly for exerting a compressive force on the separator plates of FIG. 4.

DETAILED DESCRIPTION OF THE PREFERRED EMBODIMENTS

Figure 4:
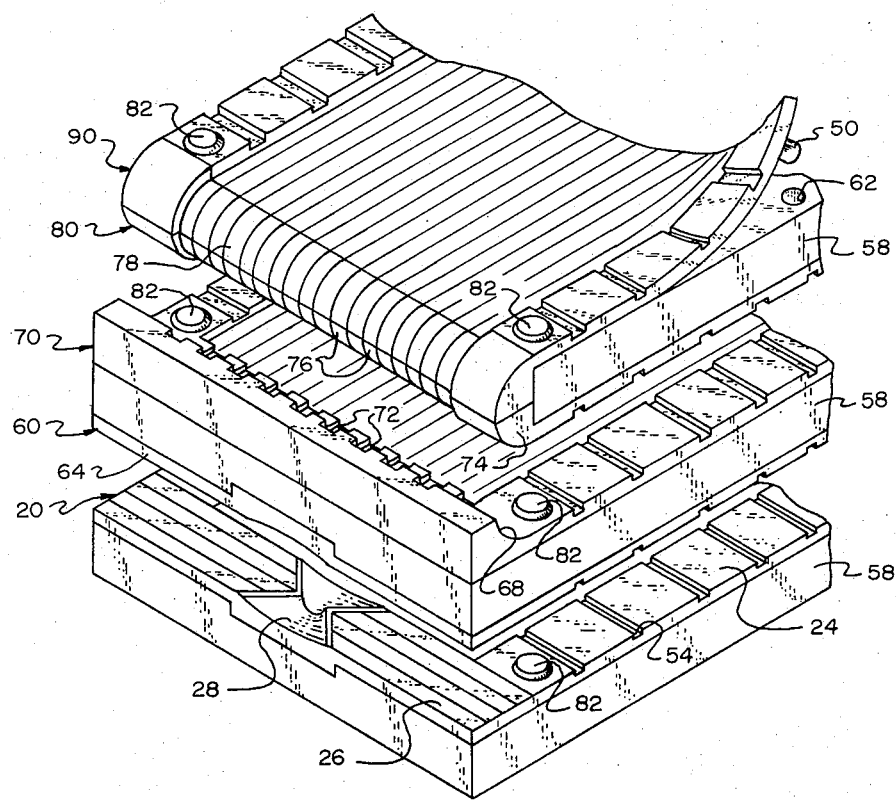
FIG. 4 is an exploded fragmentary perspective illustration of a separator plate assembly according to the presently preferred embodiment of the invention with membrane support veneers connected thereto.

Reference is now made to the figures, like parts having like numerals throughout.

Referring to FIG. 1, a membrane support generally designated 20 is illustrated. While the membrane support may be constructed of a rigid material if desired, in the illustrated embodiment the membrane support is formed of a flexible plastic material and comprises a veneer to be secured upon a rigid structural block or plate 58, as will be hereinafter more fully described. The membrane support 20 has a peripheral border including front side 22 and rear side 24. Borders 22 and 24 are continuous with a peripheral leading end 26 which has a vertical dimension essentially the same as borders 22 and 24.

The leading end 26 has a centrally located generally hourglass-shaped contoured recess 28. The recess 28 is essentially equidistant between the front and rear sides 22 and 24 and opens at the exterior edge 30 of the end 26. It also opens at the interior edge 32 of the end 26. The recess 28 receives a blood port element and attached membrane (not shown) which may be, for example, the blood port element and membrane disclosed and claimed in co-pending application Ser. No. 106,184, filed Jan. 13, 1971. The leading end 26 has a plurality of laterally extending ridges 34 which rise only slightly above the upper surface of the leading end 26 so as to minimize dialysate seepage over the leading end 26 when the membrane support 20 is in the assembled condition hereinafter more fully described.

Borders 22 and 24 are separated by a bed generally designated 36 including an array of wedge supports 38. The configuration of wedge supports 38 can best be understood by reference to FIGS. 2 and 3. Referring particularly to FIG. 2, it is noted that wedge supports 38 have outwardly sloping sides 40 which define a generally V-shaped groove 42 therebetween. Additionally, each wedge support 38 has a flattened tip 44. The vertical dimension of the wedge support 38 from the bed 36 to the flattened tip 44 is slightly less than the vertical dimension of the borders 22 and 24 from the bed to the corresponding upper surface 25.

Referring to FIG. 3, a longitudinal view of the array of support elements 38 is illustrated. In the longitudinal view, generally U-shaped transversely directed channels 46 are shown. The channels 46 separate each end 48 of each wedge support 38 from the next. It should be observed that the leading end 26 has a vertical dimension which is slightly greater than the vertical dimension of wedge supports 38 so that the upper surface of the leading end 26 is spaced slightly above the flattened tip 44 of the wedge supports 38. By way of example only, suitable dimensions for the wedge supports include a vertical height of 0.050 inches from the surface of bed 36, U-shaped groove 46 having a width of 0.032 inches and a width of the flattened surface 44 measuring approximately 0.004 inches.

It is pointed out that although this wedge support system is described in connection with extracorporeal hemodialyzing systems, it could be advantageously used with any membrane transport system.

Also, as shown in both FIGS. 2 and 3, the membrane support 20 has a plurality of integral, downwardly directed male couplings 50 used to secure the membrane support to the rigid support plate 58 as will be hereinafter more fully described.

The border 22 has a plurality of longitudinally spaced inlet ports 52 which traverse with width of the border 22. When the membrane support 20 is in the assembled condition, dialysate fluid is forced across the bed 36 through the inlet ports 52. The opposite border 24 has a plurality of longitudinally spaced outlet ports 54. The outlet ports 54 traverse the entire width of the border 24 and permit discharge of dialysate fluid from the bed 36 to the exterior of the membrane support 20. Preferably, the width of the outlet ports 54 is smaller than the width of the inlet ports 52 so that a back pressure is developed over the bed 36. This back pressure facilitates a more complete immersion of the tubular membrane in dialysate solution as the membrane is supported upon the bed 36. The membrane support embodiment illustrated in FIG. 1, as has been described, includes the leading edge 26 adapted to receive a blood port element at the recess 28. It is pointed out, however, that the membrane support 20 may have any one of a variety of leading edge configurations and also any one of a variety of trailing edge configurations. The various configurations of leading and trailing edges can best be understood by reference to FIG. 4.

In FIG. 4, membrane supports generally designated 20, 60, 70 and 80 are illustrated. Each of the membrane supports is coupled to a rigid support block or plate 58, preferably formed of plastic or the like. The support blocks 58 have spaced female couplings 60 into which the male couplings 50 (see also FIGS. 2 and 3) are inserted. When the membrane supports are coupled to the support blocks 58, relative movement of the membrane support and the corresponding support block is precluded until the membrane support is peeled away from the support block as shown at the top of FIG. 4.

The membrane supports 20, 60, 70 and 80 are configurated to define a convoluted path for a tubular membrane. The tubular membrane opens at the leading end 26 of the support 20 and also at the corresponding leading end 64 of the membrane support 60. The illustrated portion of membrane support 70 comprises a concave shoulder 68 containing a plurality of conforming grooves 72. The membrane support 80 which is directly opposite membrane support 70 has a generally convex leading edge 74 which is configurated to nest against the concave shoulder 68. Additionally, the leading end 74 has grooves 76 disposed in general alignment with grooves 72. The membrane support 90 is essentially the mirror image of membrane support 80 and, when assembled upon plate 58, as shown, the convex leading end 78 is urged against the leading end 74 of support 80. Preferably, the grooved surfaces between the borders on the convex and concave ends 74 and 68 are recessed to allow blood in the tubular membrane (not shown) to easily flow between the nested concave and convex ends.

While not specifically illustrated in FIG. 4, each of the membrane supports 20, 60, 70, 80 and 90 has a trailing end which is substantially similar to the above-described leading ends in such a way as to form a continuous convoluted membrane path. More specific description of the convoluted membrane path can be found in my co-pending U.S. Patent application Ser. No. 106,184, filed Jan. 13, 1971.

The support blocks 58 with membrane supports 20, 60, 70, 80 and 90 attached thereto are provided with alignment structure comprising outwardly projecting dowels 82 in the supports 20, 70 and 90 and mating recesses (not shown) in the opposed membrane supports 60 and 80, respectively. The dowels and mating recesses advantageously insure proper alignment of the support blocks 58 and corresponding membrane supports.

When the membrane supports 20 are secured to the plates 58 and assembled as shown in FIGS. 4 and 5, the assembled supports are placed in a dialyzing container generally designated 100 (FIG. 5). The dialyzing container 100 has a back wall 102 having at least one aperture 104 therein. Aperture 104 is an inlet port for dialysate solution. A coupling 106 aligned with the aperture 104 projects away from the wall 102 and normally receives conduit (not shown) for carrying the dialysate solution. The rear wall 102 is integrally connected with a bottom wall 108, the bottom wall having a peripheral ridge 110 which spaces the assembled membrane supports away from the back wall 102 as will be subsequently more fully described.

The bottom 108 is also joined to end walls 112 (only one of which is illustrated in FIG. 5) and a front barrier 114. Each end wall 112 has a vertical groove 116 extending essentially the entire length of the end wall 112 and opening at the upper edge thereof. Front container wall 118 is secured to the container 100 by inserting the wall 118 into the grooves 116.

The front wall 118 is secured tightly in place by fasteners generally designated 120 located at both ends of the container 100. Each fastener 120 has an elongated engaging blade 122 which forces the wall 118 to an immovable position as illustrated in FIG. 5 when the clamp is in the closed position. The blade 122 is connected to arms 126 pivotally joined in a conventional way to bracket 128. The position of the arms 126 is controlled by handle 124 so that when the handle is in the illustrated position, the blade 122 is urged tightly against the wall 118. When desired, the handle may be displaced into the plane of the paper, causing the blade 122 to move away from the wall 118. Thus, wall 118 may be released and easily removed from the container 100 to facilitate placement of the membrane supports in the container 100.

Within the container 100 is a clamp assembly generally designated 130. The clamp assembly 130 comprises a lower fixed beam 132 having side rails 134 and 136 and cross-members 138 (only one illustrated in FIG. 5). Although any suitable number of cross-members 138 could be used, two symmetrically spaced cross-members 138 have been found adequate. Both ends of side rails 134 and 136 are removably connected to vertical bars 140 and 142 at both ends of the container 100.

Each vertical bar 140 has a laterally extending keyway 144 which opens to one side of the bar 140 or 142. Preferably, each bar 140 and 142 also has a keyway (not shown) at the lower end adjacent side rails 134 and 136.

An upper beam 148 has side rails 150 and 152 which are in general alignment with corresponding side rails 134 and 136. The side rails each has an outwardly projecting key 151 adapted to be inserted into keyways 144 so as to fix the vertical position of beams 148 and 132. The upper beam 148 also has cross-members 154 located near each end of the side rails 150 and 152. Each cross-member 154 is integrally joined to a toggle press 160.

The toggle press 160 displaces a press head 162 to the illustrated position when handle 164 is in the illustrated down position. When the handle 164 is displaced upwardly as from the FIG. 5 position, the press head 162 will be rotated clockwise (as shown in FIG. 5) about the axis of pin 165 and lifted vertically. The press head 162 is provided with a depending shaft 166 which terminates in a rounded tip 168. Preferably, the shaft 166 is adjustable with respect to the press head 162 so that the length of the shaft 166 below the lower edge of the head 162 can be varied.

A floating beam generally designated 170 is adapted to rest upon the upper surface of the uppermost support block 58. The floating rail 170 has side rails 172 and 174 and spaced cross-members 176. The spaced cross-members are located so as to be immediately beneath the shaft 166 and rounded tip 168 when the press head 162 is in the illustrated downward position. Further, each cross-member 176 has a recess 178 adapted to receive the rounded tip 168 of the toggle press 160 in mating relation.

It should be appreciated that when the outwardly projecting keys 151 of rails 150 and 152 are inserted in the keyways 144, the upper beam 148 and the lower beam 132 have a fixed position one with respect to the other. Rails 172 and 174 are slightly shorter than rails 134 and 136 or 150 and 152. Accordingly, the floating beam 170 can assume any vertical position between the beams 132 and 148.

When the membrane support blocks 58 and attached membrane supports 20, 60, 70, 80 and 90 have been assembled and placed on lower beam 132, the floating rail 170 may be placed on top of the uppermost support block 58 and then the upper fixed beam 148 can be connected to the vertical bars 140 and 142. When the length of shaft 166 has been properly adjusted, the handle 164 of each toggle press 160 can be diplaced downwardly to the position shown in FIG. 5, thereby causing the press head 162 to exert a force through the shaft 166 upon the floating beam 170. The force exerted through the toggle presses is distributed by the floating beam 170 over the support blocks 58 generally uniformly.

It should be appreciated that the downward compressive force through the support plates can be adjusted by adjusting the length of the shaft 166. Once adjusted, shaft 166 will always exert the same downward pressure through the floating rail 170 as long as the same number of support blocks 58 and attached support membranes are used.

The pressure exerted by toggle presses 160 through the assembled support blocks 58 can be instantly released by lifting the handle 164. Thereafter, the upper beam 148 may be removed by sliding the key 151 along the keyway 144 until the upper beam 148 can be easily removed. The floating beam 170 may then be removed by lifting the beam 170 vertically from the support blocks 58. If it is desired to remove some or all of the assembled support blocks 58, the front wall 118 may be loosened by displacing the fastener 120 to the open position. Thereafter, the front wall 118 may be lifted vertically out of the slot 116 thereby giving facile hand access to the support blocks for disassembly. Reassembly can take place easily in the reverse order.

The clamping assembly 130 advantageously provides a way of exerting a constant uniform compressive force on the assembled membrane supports. No adjustment is needed to maintain constant predetermined pressure unless the number of membrane supports used are changed. When fewer membrane supports are used, the floating beam 170 will assume a position somewhat lower than that illustrated in FIG. 5 but a compressive force can still be equally distributed over the membrane supports when the shaft 166 of the toggle press 160 is lengthened to appropriately engage the floating embodied 170 at the cross-beam 176. Conversely, when more membrane supports are used, the shaft 166 can be shortened.

The invention may be mebodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A membrane support comprising:
   a bed;
   a plurality of wedge support elements mounted upon the bed in an array, each wedge support element being separated (a) by a generally V-shaped groove from the corresponding wedge elements on each side and (b) by a generally U-shaped channel from corresponding wedge elements at each end; and
   a peripheral border integral with the bed defining a fluid reservoir for intimately exposing a membrane traversing the wedge support elements to fluid in the reservoir, said peripheral border defining spaced recesses along one side of the membrane support for admitting a liquid to the bed and spaced recesses along the opposed side for discharging the liquid from the bed, said discharging recess having a smaller dimension than said admitting recesses to regulate desired back pressure to assure total immersion of membrane in dialysate solution.

2. A membrane support as defined in claim 1 wherein said wedge support elements present a flat surface at the tip of the wedge.

3. A membrane support as defined in claim 1 wherein said peripheral border has a thickness which is greater than the vertical dimension of the wedge support elements, the border further comprising a contoured recess which defines a fluid path into or out of the bed.

4. A membrane support as defined in claim 1 wherein said bed is formed of a flexible material and is superimposed over and removably attached to a rigid structural frame.

5. A membrane support for an extracorporeal hemodialyzer comprising:
   an array of stacked rigid plates;
   a veneer superimposed upon and removably attached to each plate and forming a convoluted membrane path, the veneer comprising:
     a bed;
     a plurality of wedge support elements mounted upon the bed in a regular array, each wedge support element being separated (a) by a generally V-shaped groove from the corresponding wedge elements on each side and (b) by a generally U-shaped channel from the corresponding wedge elements at each end;
     a peripheral border integral with the bed defining a fluid reservoir for intimately exposing a membrane traversing the wedge support elements to fluid in the reservoir; and
   means aligning each plate and superimposed veneer.

6. A membrane support as defined in claim 5 wherein said veneer comprises a flexible assembly of wedge support elements, the assembly being secured by male-female coupling means to an inside face of each rigid plate in the stacked array.

7. A membrane support as defined in claim 5 wherein said aligning means comprises a dowel in at least one part of the veneer and a mating recess in at least one corresponding opposed part of the veneer.

8. A membrane support assembly for an extracorporeal hemodialyzer comprising:
   a plurality of vertically stacked support plates defining a convoluted membrane path therebetween;
   a lower beam upon which the vertically stacked support plates rest, said lower beam having attached vertically projecting members;
   an upper beam connected to the vertically projecting members, said upper beam comprising biasing means for exerting a downwardly directed force; and
   a rigid floating beam having parallel side members and at least one cross-member integrally joining the side members, the beam being adapted to rest upon the uppermost of the support plates and said cross-member comprising means impinged upon by the biasing means for distributing the downwardly directed force over the vertically stacked support plates.

9. A membrane support assembly as defined in claim 8 wherein at least said upper beam comprises means for selectively separating the upper beam from the vertically projecting members.

10. A membrane support assembly as defined in claim 8 further comprising a container enclosing the stacked support plates, the container comprising:
   a back wall having inlet port means for admitting dialyzing fluid;
   end walls, each having a vertical groove therein;
   a bottom plate supporting the back wall and side walls;
   a front wall adapted to span between the end walls and sized to fit within the vertical grooves therein; and
   means for releasably securing the front wall to the end walls.

11. A membrane support comprising:
   a bed adapted to receive at least a portion of a folded membrane which conducts blood longitudinally along the bed;
   a plurality of support elements mounted upon the bed in an array for supporting the folded membrane, the support elements defining a path for dialysate fluid which path is transverse across the bed and which crosses the direction of blood flow; and
   a peripheral border integral with the bed defining a fluid reservoir for intimately exposing a membrane traversing the support elements to fluid in the reservoir, said peripheral border defining spaced openings along one side of the membrane support for admitting dialysate fluid to the bed and spaced openings along the opposite side for discharging the dialysate fluid from the bed, said discharging opening having a smaller transverse dimension than the admitting opening to develop desired back pressure to assure total immersion of the membrane in dialysate fluid.

* * * * *